United States Patent [19]

Oyama et al.

[11] Patent Number: 5,067,050
[45] Date of Patent: Nov. 19, 1991

[54] ILLUMINATED ELECTRICAL PART

[75] Inventors: Minoru Oyama; Misturu Furudate, both of Furukawa, Japan

[73] Assignee: Alps Electric Co., Ltd., Tokyo, Japan

[21] Appl. No.: 666,097

[22] Filed: Mar. 7, 1991

[30] Foreign Application Priority Data

May 1, 1990 [JP] Japan .................... 2-45100[U]

[51] Int. Cl.⁵ .................................. G01D 11/28
[52] U.S. Cl. .................... 362/30; 362/354; 362/373
[58] Field of Search .............. 362/23, 29, 30, 85, 362/290, 291, 354, 373

[56] References Cited

U.S. PATENT DOCUMENTS

| | | | |
|---|---|---|---|
| 4,328,532 | 5/1982 | Smith | 362/30 X |
| 4,448,835 | 4/1984 | Bräutigam et al. | 362/30 X |
| 4,807,091 | 2/1989 | Obata | 362/30 |

Primary Examiner—Stephen F. Husar
Attorney, Agent, or Firm—Guy W. Ghoup; B. Noel Kivlin

[57] ABSTRACT

An illuminated electrical part comprises a case, an indicator panel attached to the open front end of the case, a housing attached to the case so as to define an illuminating space behind the indicator panel, and an illuminating device comprising a light source disposed behind the indicator panel and mounted on the housing, and a cover formed of a highly heat-conductive material, fixed to the housing so as to cover the light source and provided with light control slits in its top wall extending between the indicator panel and the light source and with light control apertures in its opposite side walls. The numbers, shape and arrangement of the light control slits and the light control apertures are determined selectively so that the entire area of the indicator panel is illuminated uniformly by light emitted by the light source, scattered by the inner surface of the housing and shed through the light control slits and the light control apertures.

2 Claims, 3 Drawing Sheets

ILLUMINATED ELECTRICAL PART

BACKGROUND OF THE INVENTION

1. Field of the Invention

The present invention relates to an illuminated electrical part and, more particularly, to the improvement of an illuminating device for illuminating the indicator panel of an illuminated electrical part from behind the same.

2. Description of the Related Art

An illuminating device for illuminating the indicator panel of an electrical part from behind the indicator panel has been used widely, for example, for illuminating the indicator panel of an automotive electrical part during the night or while the automobile is in a tunnel. The illuminating device for such a purpose is desired to be capable of substantially uniformly illuminating the entire area of the indicator panel of an electrical part and of avoiding producing local, excessively bright or excessively dark portions in the indicator panel.

Referring to FIGS. 3 and 4 showing a conventional illuminated electrical part, the illuminated electrical part has a case 1 having an opening 2, and an indicator panel 3 fixedly covering the opening 2. A lamp 5, i.e., a light source, is fixed to a support plate 4 attached to the case 1 on the backside of the indicator panel 3, and a light conductor 6 formed of an acrylic resin is attached to the support plate 4 so as to cover the lamp 5. Light emitted by the lamp 5 is conducted by the light conductor 6 so as to illuminate the indicator panel 3 from behind the same. The illuminated electrical part is provided with through holes 7 for receiving operating members therethrough.

The light conductor 6 of the conventional illuminated electrical part, however, has errors in geometry, and hence the indicator panel 3 cannot be illuminated in satisfactorily uniform illuminance by the light emitted by the lamp 5. To compensate the irregular illumination of the indicator panel 3 by the lamp 5, color films are printed in layers over the indicator panel 3, in which a film of a dark color is printed over areas in which the illuminance is higher than other areas and a film of a bright color, which is more transmissive than the film of the dark color, is printed over areas in which the illuminance is lower than other areas so that the overall illuminance of the indicator panel 3 is uniform. Such a measure to compensate the irregular illumination of the indicator panel 3 increases the manufacturing cost of the electrical part and requires very difficult work to print the color films so that boundaries between the color films are not conspicuous.

Since the distance l (FIG. 3) between the lamp 5 and the light conductor 6 must be sufficiently large to obviate the adverse influence of heat generated by the lamp 5 on the light conductor 6, and the light conductor 6 must have a sufficiently large thickness, it has been difficult to form the illuminated electrical part employing such an illuminating device in a reduced thickness.

SUMMARY OF THE INVENTION

Accordingly, it is an object of the present invention to provide an illuminated electrical part having an illuminated indicator panel, and an illuminating device capable illuminating the indicator panel uniformly without requiring printing a plurality of color films on the indicator panel for illuminance adjustment and of enabling the electrical part to be formed in a relatively thin construction.

In one aspect of the present invention, an illuminated electrical part comprises an indicator panel, and an illuminating device comprising a light source disposed behind the indicator panel, and a cover covering the light source, formed of a highly heat-conductive material, and provided with light control slits.

In this illuminated electrical part, light emitted by the light source travels through the light control slits of the cover and falls on the backside of the indicator panel to illuminate the indicator panel. The number of the light control slits, and the position and shape of each light control slit are determined selectively so that the indicator panel is illuminated uniformly and the illuminance of the front surface of the indicator panel is uniform. Since the cover is formed of a highly heat-conductive material, the indicator panel is insulated from heat generated by the lamp, so that the indicator panel is not affected adversely by the heat generated by the light source even if the light source is disposed close to the indicator panel.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

Figure 1:
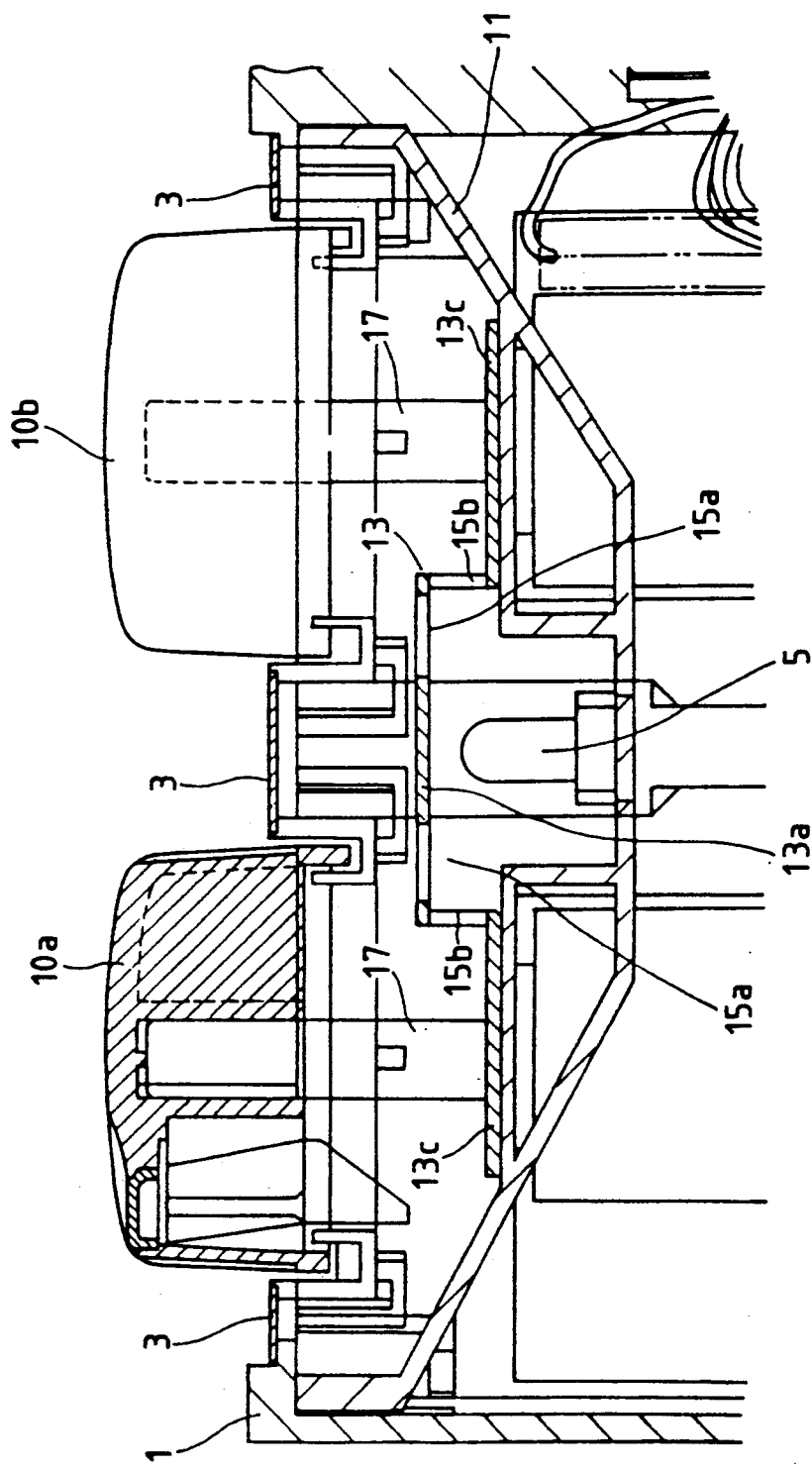
FIG. 1 is a sectional view of an essential portion of an illuminated electrical part, in a preferred embodiment according to the present invention.

Referring to FIG. 1, an illuminated electrical part in a preferred embodiment according to the present invention comprises a case 1, an indicator panel 3 supported on the case 1, knobs 10a and 10b disposed on the front surface of the indicator panel 3 to operate the electrical part, a housing 11 fixed to the case 1 so as to cover the backside of the indicator panel 3, and an illuminating device comprising a lamp 5, i.e., a light source, supported on the housing 11, and a cover 13 formed of a highly heat-conductive metal and fixes to the housing 11 so as to cover the lamp 5.

Figure 2A:
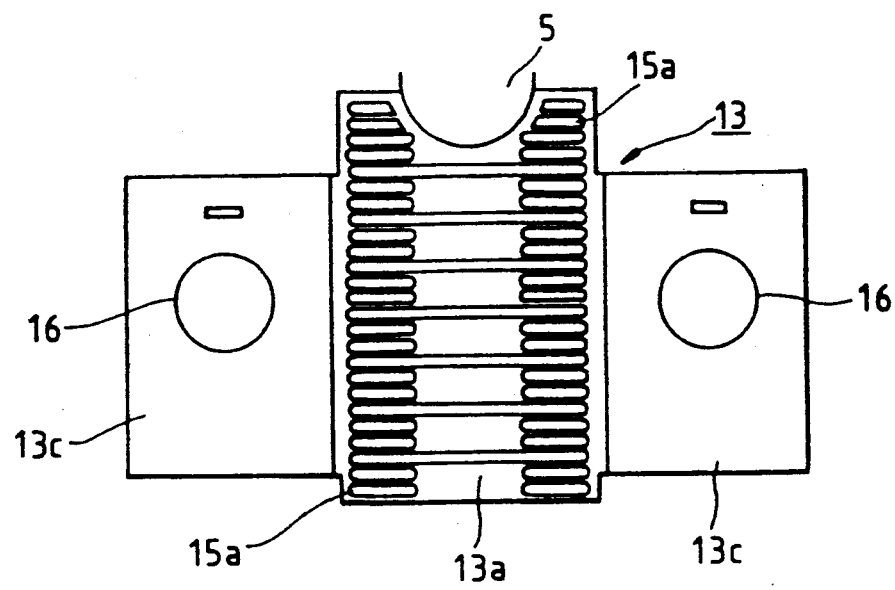
FIGS. 2(a), 2(b) and 2(c) are a plan view, a front view and a side view, respectively, of a cover included in the illuminated electrical part of FIG. 1.
Figure 2B:
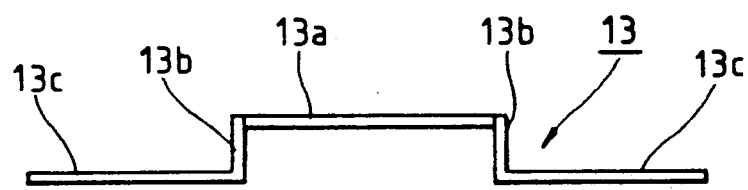
Figure 2C:
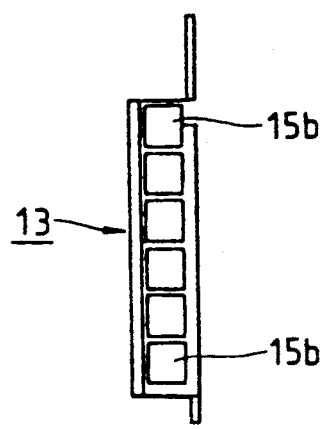
Figure 3:
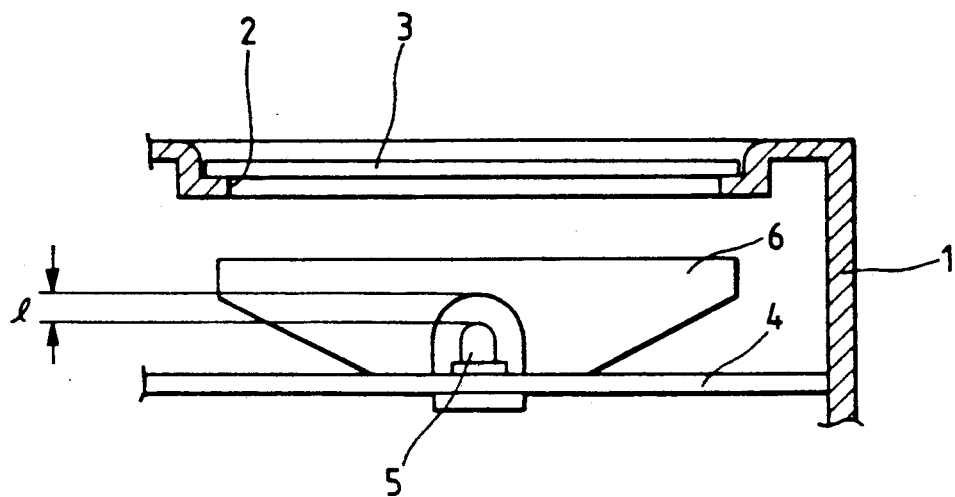
FIGS. 3 and 4 are a sectional view and a plan view, respectively, of an essential portion of a conventional illuminated electrical part.
Figure 4:
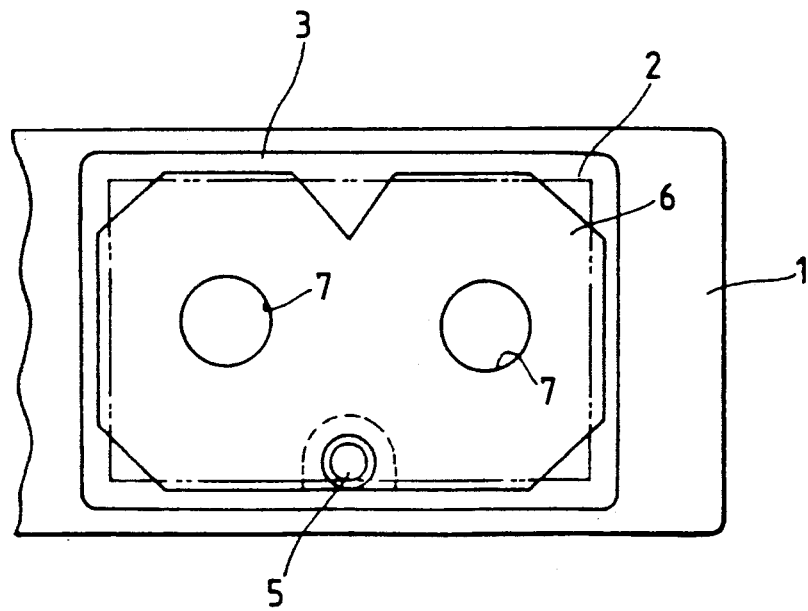

As shown in FIGS. 2(a) to 2(c), the cover 13 has a top wall 13a, opposite side walls 13b, and flanges 13c extending respectively from the lower edges of the side walls 13b. Twenty-five slits 15a of 1 mm in width and 6.5 mm in length are formed at a pitch of 1.5 mm in the top wall 13a along each side of the same to avoid the direct illumination of the central area of the indicator panel 3 by the light emitted by the lamp 5, and six 7 mm×4.5 mm rectangular apertures 15b are formed in each side wall 13b. Through holes 16 for receiving operating rods 17 are formed respectively in the flanges 13c. The cover 13 is fastened to the housing 11 so as to cover the lamp 5, and the operating rods 17 are passed respectively through the through holes 16. The numbers, shapes and arrangement of the slits 15a and the apertures 15b of the cover 13 are determined selectively so that the indicator panel 3 is illuminated substantially uniformly by the light emitted by the lamp 5.

Light emitted by the lamp 5 is scattered by the inner surface of the housing 11 and falls on the backside of the indicator panel 3. light passed through the slits 15a of the top wall 13a of the cover 13 illuminates the central area of the indicator panel 3 between the knobs 10a and 10b, and light passed through the apertures 15b of the side walls 13b of the cover 13 illuminates areas of the indicator panel 3 near the opposite edges of the same. Thus, the indicator panel 3 is illuminated only by the light scattered by the inner surfaces of the cover 13 and the housing 11 substantially uniform illuminance. A sufficient quantity of scattered light is shed through the relatively large apertures 15b of the side walls 13b of the cover 13 to illuminate the end areas of the indicator panel 3 remote from the lamp 5. The scattered light shed through the apertures 15b is scattered again by the inner surface of the case 1 and the housing 11 to illuminate the end areas of the indicator panel 3 uniformly. Thus the entire area of the indicator panel is illuminated in uniform illuminance.

The cover 13 formed of the highly heat-conductive material transfers heat generated by the lamp 5 through the housing 11 to the case 1 to suppress heating the indicator panel 3 by the heat generated by the lamp 5. Therefore, the lamp 5 covered with the cover 13 can be disposed near the indicator panel 3, which enables the illuminated electrical part in a reduced thickness.

The illuminating device may be provided with a plurality of lamps, and the housing 11 and the cover 13 may be modified according to the number of the lamps. The cover 13 may be joined to the case 1 to transfer heat directly from the cover 13 to the case 1 for the enhancement of the cooling effect of the cover 13.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An illuminated electrical part comprising:
   a case;
   an indicator panel fixed to the front open end of the case;
   a housing attached to the case so as to define an illuminating space behind the indicator panel; and
   an illuminating device comprising:
   a light source disposed behind the indicator panel and mounted on the housing; and
   a cover formed of a highly heat-conductive material, fixed to the housing so as to cover the light source, and provided with light control slits in its top wall extending between the indicator panel and the light source and with control apertures in its side walls.

2. An illuminated electrical part according to claim 1, wherein the slits of the top wall of the cover are arranged in the opposite end areas of the top wall near the opposite edges of the same.

* * * * *

UNITED STATES PATENT AND TRADEMARK OFFICE
CERTIFICATE OF CORRECTION

PATENT NO.   :   5,067,050
DATED        :   November 19, 1991
INVENTOR(S)  :   M. Oyama et al.

It is certified that error appears in the above-identified patent and that said Letters Patent is hereby corrected as shown below:

Col. 4 line 26 after "with" insert --light--

Signed and Sealed this

Thirtieth Day of March, 1993

*Attest:*

STEPHEN G. KUNIN

*Attesting Officer*     Acting Commissioner of Patents and Trademarks